United States Patent
Spinrad et al.

(10) Patent No.: US 6,873,935 B2
(45) Date of Patent: Mar. 29, 2005

(54) SYSTEM AND METHOD FOR STATICALLY CHECKING SOURCE CODE

(75) Inventors: Sandford L. Spinrad, Redmond, WA (US); Steven R. Hollasch, Redmond, WA (US); Shobana M. Balakrishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 5 days.

(21) Appl. No.: 10/379,454

(22) Filed: Mar. 3, 2003

(65) Prior Publication Data

US 2004/0176930 A1 Sep. 9, 2004

(51) Int. Cl.[7] .............................................. G06F 3/023
(52) U.S. Cl. ....................... 702/186; 702/183; 702/188; 702/190; 702/198
(58) Field of Search ................................. 702/179, 182, 702/183, 188, 190, 198, 189; 707/102; 709/223; 717/143, 115

(56) References Cited

U.S. PATENT DOCUMENTS

| | | | |
|---|---|---|---|
| 6,658,416 B1 * | 12/2003 | Hussain et al. ............... 707/10 |
| 6,678,883 B1 * | 1/2004 | Berry et al. .................. 717/128 |
| 6,681,230 B1 * | 1/2004 | Blott et al. ............... 707/104.1 |
| 6,681,380 B1 * | 1/2004 | Britton et al. ............... 717/115 |

* cited by examiner

*Primary Examiner*—Marc S. Hoff
*Assistant Examiner*—Felix Suarez
(74) *Attorney, Agent, or Firm*—Merchant & Gould P.C.

(57) ABSTRACT

The present invention is directed at a system and method for statically checking source code to determine potential compatibility issues with a new software release. The system and method perform a static check on input source files associated with a software release. The static check includes identifying programming constructs, such as function prototypes, structures, unions, and the like, within source code files associated with the software release. The programming constructs undergo a filtering process that reduces the number of potentially false change errors. The filtered programming constructs are saved in a database associated with the software release. The database is then compared with another database containing programming constructs for another software release in order to identify differences between the two software releases. A list of changes is generated that identifies the differences between the two software releases. These changes are used to identify potential incompatibilities between the two software releases.

26 Claims, 4 Drawing Sheets

SYSTEM AND METHOD FOR STATICALLY CHECKING SOURCE CODE

BACKGROUND OF THE INVENTION

An important factor in determining the success of a new release of software is the degree of compatibility that the new release has with third party applications and hardware. For each error that the new release causes with existing applications and hardware, the release is viewed less and less favorably by software consumers. If the new release causes a significant number of errors, many consumers may forego upgrading to the new release, which impacts the profitability of the new release.

There have been attempts at checking new software releases for potential problems. Some attempts provide dynamic checking and others provide static checking. Dynamic checking checks the executable code as the new software release is running. Static checking checks the source code that will become the executable code of the new release.

When the source code is not very large, a manual process of comparing files may be attempted. However, typically, today, new releases involve a few thousand source code files with each source code file having several lines of code. Therefore, the manual process is not a very useful technique. Some static checkers have automated the process, but have experienced limited success. One such type of automated static checker performs a document compare on source code files in a new release with source code files from a prior release. This type of automated static checker gives many false change indications. For example, if the same code is used in the new release, but is moved within a file or is moved to another file, this type of automated static checker indicates a change in the file or files. Thus, giving a false change error. Other attempts require programmers to annotate the code in order for the static checker to identify potential problems.

Until the present invention, a static checker that works on a large source code base, requires no code annotation, and generates meaningful and useful errors has not been realized.

SUMMARY OF THE INVENTION

The present invention is directed at a system and method for statically checking source code to determine potential compatibility issues with a new software release. The system and method perform a static check on input source files associated with a software release. The static check includes identifying programming constructs, such as function prototypes, structures, unions, and the like, within source code files associated with the software release. The programming constructs undergo a filtering process that reduces the number of potentially false change errors. The filtered programming constructs are saved in a database associated with the software release. The database is then compared with another database containing programming constructs for another software release in order to identify differences between the two software releases. A list of changes is generated that identifies the differences between the two software releases. These changes are used to identify potential incompatibilities between the two software releases.

The static checker of the present invention is superior to current static checkers because the present invention minimizes the number of false change errors that get reported.

DETAILED DESCRIPTION OF THE PREFERRED EMBODIMENT

The present invention is directed at a system and method for statically checking source code to determine potential compatibility issues with a new software release. The system determines compatibility issues by tracking changes made to Application Programming Interfaces (APIs). The system and method perform a static check on input source files associated with a particular software release. The static check includes identifying programming constructs, such as function prototypes, structures, unions, typedefs, and the like. The programming constructs undergo a filtering process that reduces the number of potentially false change errors. The filtered programming constructs are saved in a database associated with the particular software release. The particular software release is then compared with an older or a new version of the software release to identify changes between the two releases. A list of changes is generated that identifies the differences between the two software releases. These changes are used to identify potential incompatibilities between the two software releases. As will be described in detail below, the static checker of the present invention is superior to current static checkers because the present invention minimizes the number of false change errors that get reported.

The following detailed description is divided into several sections. A first section describes an illustrative computing device in which the present invention may be implemented. A second section describes exemplary environments for implementing the invention. A third section describes an exemplary embodiment of the invention. It will be appreciated that the invention is not limited to the specific embodiments described herein.

Illustrative Computing Environment

Figure 1:
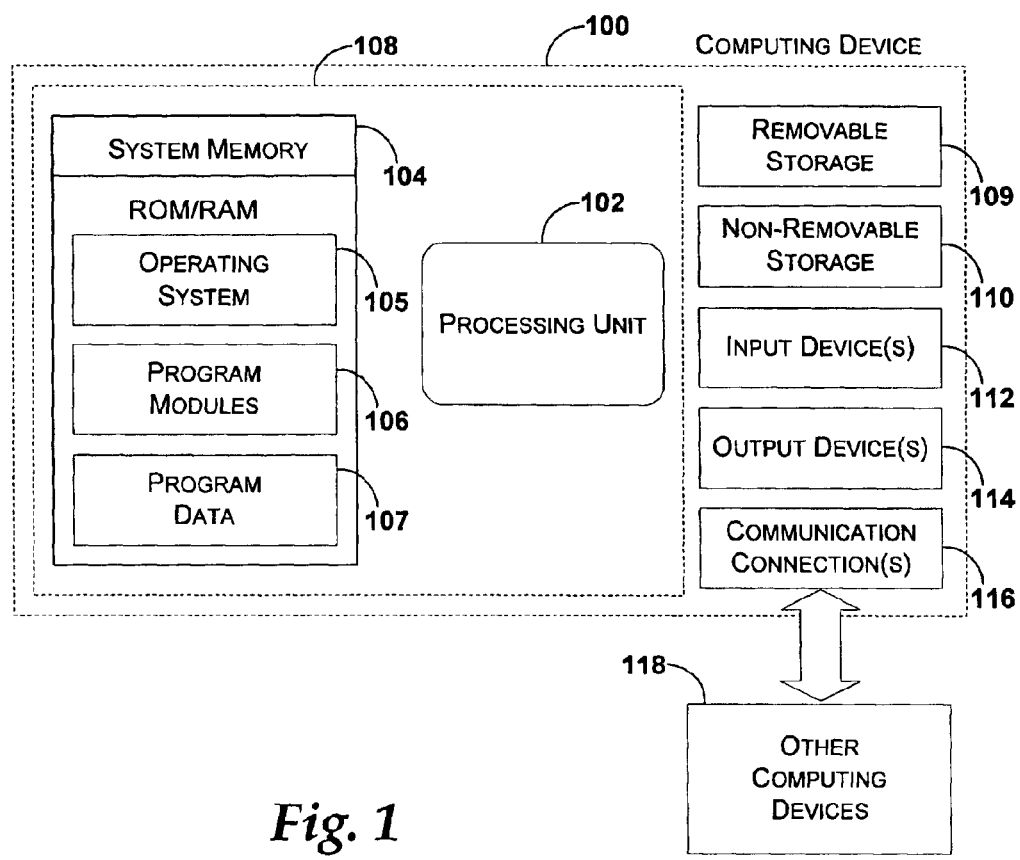
FIG. 1 illustrates an exemplary computing device that may be used in illustrative implementations of the present invention.

FIG. 1 illustrates an exemplary computing device that may be used in illustrative implementations of the present invention. With reference to FIG. 1, in a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a word processor, and the like. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Environment

Figure 2:
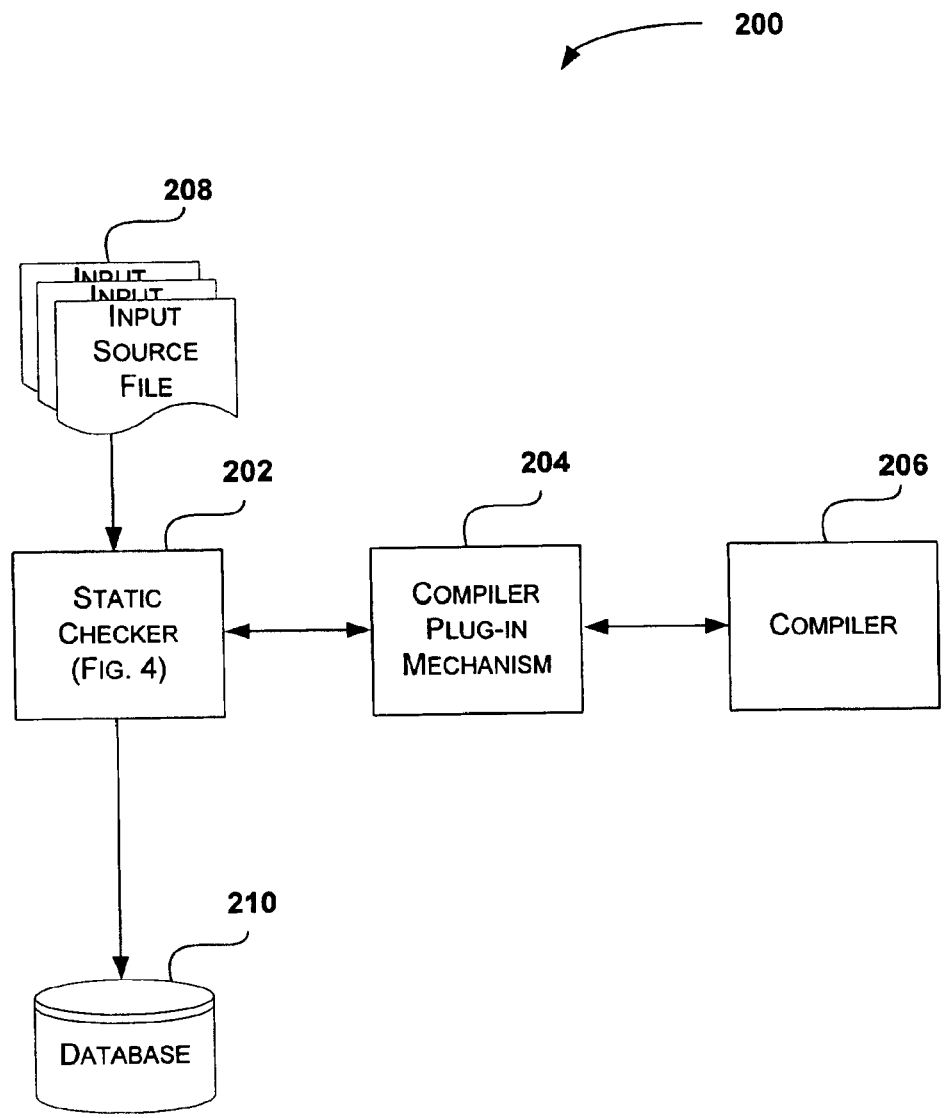
FIG. 2 is a block diagram generally illustrating an environment in which one embodiment of a static checker operates to generate a database associated with a software release in accordance with the present invention.

FIG. 2 is a block diagram generally illustrating an environment 200 in which the present invention may be implemented. The environment 200 includes a static checker 202, a compiler plug-in mechanism 204, and a compiler 206. The compiler 206 may be a commercially available compiler for compiling input source files 208. For example, if the input source files 208 are written in the C programming language, compiler 206 may be the Microsoft Visual C/C++ compiler manufactured by the Microsoft Corporation in Redmond, Washington. The compiler plug-in mechanism 204 communicates with compiler 206 in a manner such that when compiler 206 encounters programming constructs during compilation, the compiler 206 sends information regarding the programming constructs to the compiler plug-in mechanism 204. The compiler plug-in mechanism 204 then forwards the information about the programming constructs to the static checker 202 in accordance with the present invention.

The compiler plug-in mechanism 204 enables the header files to be parsed in a manner similar to the manner in which existing compilers parse header files. The compiler plug-in mechanism 204 may be a general purpose mechanism that allows third party plug-ins to be added or may be custom software written specifically for supplying the programming constructs received from compiler 206 to the static checker 202. The input source files 208 are fed into the compiler plug-in mechanism 204 by the static checker 202. One example of a general purpose compiler plug-in mechanism 204 is a programming application named "PREFAST" that is manufactured by the Microsoft Corporation in Redmond, Wash. For this embodiment, static checker 202 is registered with the operating system, which makes it available as a plug-in to the compiler plug-in mechanism 204. The compiler plug-in mechanism 204 is then configured to execute the static checker 202. In essence, complier plug-in mechanism 204 provides a means for supplying programming constructs to the static checker 202 of the present invention.

The input source files 208 represent the files associated with a particular software release. When the source files are written in C/C++, the input source files #include every header file that ships with the software release. The software release may be associated with an operating system, an application, and the like. In addition, the software release may accommodate several compilation types, such as supporting different versions of device drivers (e.g., NDIS 4, NDIS 5 and NDIS 6 versions). The input source files 208 for each software release are stored in a separate subdirectory. In addition, any input source files associated with a compilation type (e.g., NDIS 4) for the software release, are stored in a compilation subdirectory off the software release subdirectory.

The static checker 202 is configured to launch compiler 206 and the compiler plug-in mechanism 204. The static checker 202 inputs the input source files 208 and directs compiler 206 to compile the input source files 208. As mentioned above, compiler 206 compiles the input source files 208 and whenever compiler 206 encounters a programming construct, compiler 206 sends information about the programming construct to the compiler plug-in mechanism 204. The compiler plug-in mechanism 204 then relays the information to the static checker 202. Although illustrated in FIG. 2 as a single component, it will be appreciated that the static checker 202 is likely made up of several different components acting together, as will be made more clear from the following discussion in conjunction with FIG. 4. Using the information received from the compiler 206, the static checker 202 produces database 210 as output. Database 210 describes the programming constructs within the release, in addition to other information, such as #defines. Database 210 is described in more detail below in conjunction with FIG. 4. The static checker 202 may be configured to track public interface changes, private interface changes, and/or both. The following discussion describes an embodiment in which the static checker 202 is configured to track public interface changes.

Figure 3:
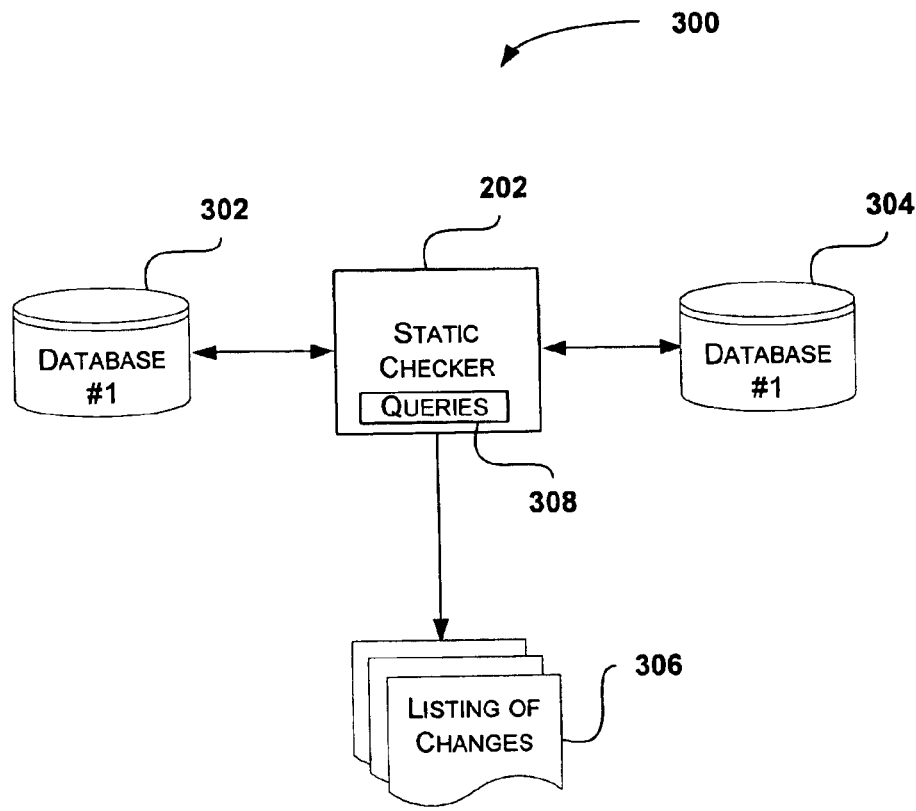
FIG. 3 is a block diagram generally illustrating an environment in which one embodiment of the static checker tracks changes between software releases using the database shown in FIG. 2 in accordance with the present invention.

FIG. 3 is a block diagram generally illustrating an exemplary environment in which the present invention is implemented. Environment 300 includes the static checker 202, a first database 302, and a second database 304. The first and second database 302, 304 are created using the environment shown in FIG. 2. In one embodiment, the base name for the software release is prefixed to all the tables within the database for the software release. Static checker 202 further includes a set of queries 308. In one embodiment, the set of queries 308 may be generated with the assistance of a script, such as a script written in the Perl programming language. The script may identify particular tags, such as those tags associated with the compilation type, processor type, base release, and the like. Upon encountering one of the particular tags, the script may substitute the tag with supported types for that tag. The script may then write out an expanded query to a temporary file that will be used to compare the databases.

The set of queries 308 compare the tables within the first and second database 302, 304 using a standard query language that is known to those skilled in the art. The set of queries 308 compares records within the first and second database 302, 304 that have the same compilation type (e.g., NDIS 5). During this comparison, a list of changes 306 is generated. The list of changes 306 may be in one document or in several documents. For example, the list of changes 306 may include a document for each type of programming construct. In this case, the document pertaining to one particular programming construct will list the syntactical changes identified for that particular programming construct (e.g., function prototype) between the first and second database 302, 304. The list of changes 306 will identify inconsistencies between the software releases, such as function prototypes that have been added, programming constructs that have changed, header sets that are inconsistent, and the like.

Illustrative Implementation

Figure 4:
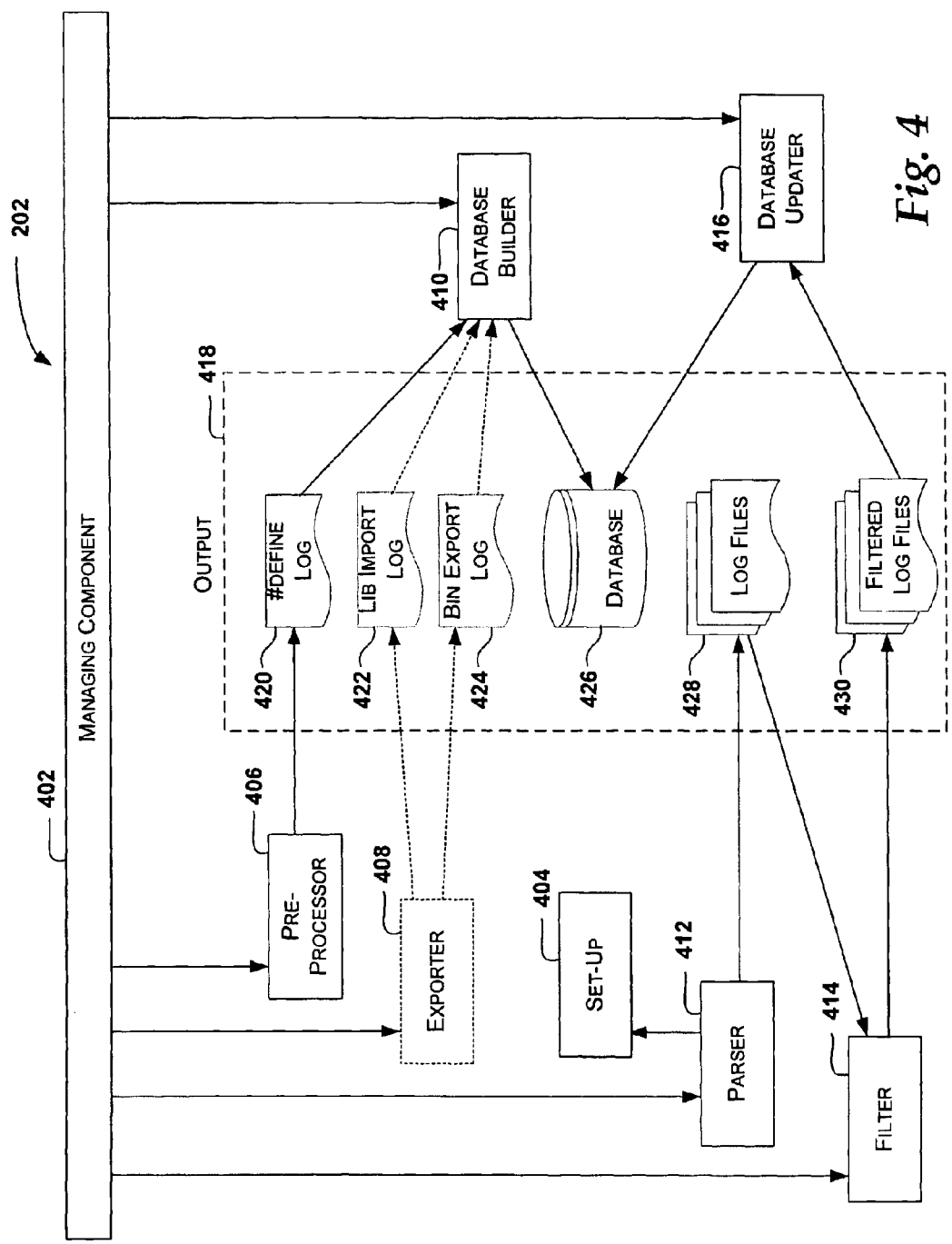
FIG. 4 is a operational flow diagram illustrating one embodiment of the static checker shown in FIG. 2 in accordance with the present invention.

FIG. 4 is an operational flow diagram illustrating one embodiment of the static checker 202 shown in FIG. 2. Static checker 202 includes several components that collectively operate to create a database associated with a designated software release. The database identifies the programming constructs defined within the software release and other information pertinent to determining whether the software release may cause compatibility issues with other software releases. FIG. 4 illustrates the components and also graphically illustrates output 418 generated by the static checker 202. The output 418 may be a file that is stored, data resident in memory, formatted information (e.g., a database) that is stored, and the like. As one will see, the format of output 418 is not particularly important. However, when the format of output 418 is advantageous if provided in a particular format, the particular format is described below.

The static checker 202 includes a managing component 402, a set-up component 404, a pre-processor component 406, an optional exporter component 408, a parser component 412, a filter component 414, a database builder component 410, and a database updater component 416. As those skilled in the art will appreciate the functionality provided by these components may be combined or further divided without departing from the scope of the present invention. The following discussion has divided the functionality provided by static checker 202 into components 404–416, which will now be described in detail.

The managing component 402 is configured to manage the execution of the other components 404–416. The managing component 402 manages the input source files (not shown) in a manner such that the location of the input source files do not negatively impact the operation of the static checker 202. For example, in some software releases, header files may be located in the same directories as sample source files. If this occurs, the include paths may be conditionally embedded into the input source files, which is undesirable. Therefore, in this situation, the managing component 402 copies the header files located in the sample source tree into the main include directory associated with the software release. In addition, the managing component 402 identifies each conditional that the parser component 412 uses when generating the log files 428. The list of conditionals may be obtained from documentation or may be retrieved from each input source file. As will be explained below, because the static checker is aware of the conditional that is defined when a particular programming construct is encountered, the static checker records the condition along with the programming construct in the database. Therefore, in accordance with the present invention, the static checker compares programming constructs that are generated with the same condition defined, which reduces the number of errors generated.

The managing component 402 is also configured to launch the pre-processor component 406. As described above, the static checker of the present invention uses a compiler (i.e., compiler 206 shown in FIG. 2) to obtain the programming constructs. However, compiler 206 supplies the compiler plug-in mechanism 204 the programming constructs after the input source files have been pre-processed. Therefore, static compiler 202 includes the pre-processor component 406 that searches for "#define" within the input source files. Upon finding "#define", the pre-processor component 406 writes the "#define" declaration to a #define log 420. The #define log 420 may be a text file, a structured binary file, or the like.

Pre-processor component 406 handles macro declarations that are on a single line or span multiple lines. In addition, if the macro declaration does not include a value, the pre-processor component 406 writes a string "<NO VALUE>" in a value column within the #define log 420. Because pre-processor component 406 performs mainly string manipulation, one embodiment for pre-processor component 406 is a script written using the Perl programming language. However, pre-processor component 406 may be written using other programming languages.

Exporter component 408 is an optional component. Managing component 402 determines whether or not to execute the exporter component 408 based on a command line parameter given to execute the static checker. For example, in one embodiment, the static checker 202 is invoked using the following command line syntax:

<executable name><path><sub-dir><base kit name> [<SkipBin>]

where,

<executable name>=the name of the static checker executable

<path>=the path to the input source file directory

<sub-dir>=the subdirectory name of the base kit

<base kit name>=name that will become the name of database

<SkipBin>=parameter for determining whether to produce binary import table.

The <SkipBin> parameter may be specified if the static checker is running against the base build. Also, the <SkipBin> parameter may be specified if the static checker is not interested in private prototypes, such as prototypes declared in header files, but not exported in a binary file. If the <SkipBin> parameter is not specified, the managing component 402 calls the exporter component 408. The exporter component 408 logs all the exports given in the libraries and the binaries associated with the target build. In one embodiment, exporter component 408 uses dumpbin to log the exports. In one embodiment, dumpbin may be provided by the compiler. The libraries are stored in a Lib Import Log 422 and the binaries are stored in a Bin Export Log 424.

The managing component 402 is also configured to invoke the database builder component 410. The database builder component 410 is responsible for creating a new database that will become populated with programming constructs. If a database with the same name as the name specified on the command line already exists, the database builder component 410 attempts to remove the existing database. Using a standard database interface, such as ActiveX Data Objects (ADO), the database builder component 410 creates a new database file 426 and begins adding tables. In one embodiment, separate tables are used to store the various programming constructs. Thus, there may be separate tables for function prototypes, structures, unions, classes, enums, typedefs, global variables, #defines, library exports, binary exports, and the like.

Each table has various fields associated with the type of programming constructs that is being stored. For example, a function prototype table may include fields for identifying the name of the function, a return type, a type for each parameter, and the like. A variable table may include fields for identifying the name of the variable and the type. A structure table may include fields for identifying the name of the structure, the name of a member, the type and name of each variable, and the like. In one embodiment, the structure table may also include a memo field called "members" that contains a string representation of all the members in the structure. The members in the string may be separated by the pipe '|' character. In addition, the structure table may include a number of character fields for storing pieces of the memo field. This is useful when queries cannot use the memo field. The character fields may be fixed at a predetermined number of bytes (e.g., 255 bytes). The first character field stores the first predetermined number of bytes of the memo field, the next character field stores the next predetermined number of bytes of the memo field, and so on. In addition, each table includes a header field that identifies the header file containing the programming construct and a compilation type field that stores the compilation type (e.g., NDIS 4) that is defined when the programming construct is identified.

The database builder component 410 also creates an index for each table that has a unique attribute set. This prevents duplicate records from being recorded in the database 426. Because several header files may be included more than once, the log files 428, described below, may contain duplicate records. Thus, the indexes created by the database builder component 410 prevent these duplicate records from being duplicated within the database 426. Database builder component 410 may also create other indexes which improve query performance. Database builder component 410 is configured to import the records from the #define log 420, the lib import log 422, and the bin export log 424 into the database 426.

The parser component 412 is invoked by the managing component 402 to obtain the information about the programming constructs that will be stored in the database 426. Parser component 412 first creates a build environment appropriate for the type of software release. The build environment may be created by calling the set-up component 404. The set-up component 404 is configured to properly set-up the build environment for the associated software release using the parameters supplied by the parser component 412 from the managing component 402. For example, the settings may be parameters that are input into a "setenv.cmd" associated with a particular operating system. The managing component 402 determines the parameters and supplies the parameters to the parser component 412 which in turn calls the set-up component 404 and provides the parameters to the set-up component 404.

The parser component 412 configures the build environment in a manner such that the compiler plug-in mechanism 204 is invoked in conjunction with compiler 206. Each directory in the input source directory tree associated with the new software release is parsed in the following manner. The parser component 412 deletes any previous log files 428 in the current directory and launches a build of the input source files found in the current directory. The build will launch the compiler plug-in mechanism that will enable the static checker to generate the log files 428. The log files 428 list the programming constructs identified in the header files associated with the new software release. In one embodiment, there may be a plurality of log files with each log file being associated with one type of programming construct. For example, a log file associated with function prototypes may contain lines that list the function name, return type, and the parameters to the function for each function prototype identified.

Parser component 412 launches the builds of the input source files by the compiler and the compiler plug-in mechanism. Using the information obtained from the compiler via the compiler plug-in mechanism, the parser component 412 creates log files 428. The parser component 412 is aware of each compilation type and directs the compiler and compiler plug-in mechanism to provide the programming constructs for each compilation type. The compilation type is then saved with the identified programming construct in the log files 428.

The managing component 402 invokes the filter component 414. The filter component 414 is responsible for filtering the entries in the log files 428 in a manner to reduce the number of erroneous change indications. For example, spaces may be removed from prototypes so that a compare on the same prototype, but having a space, does not get reported as a change. Thus, the filter component 414 inputs the log files 428, filters the log files 428, and outputs a filtered version of the log files (i.e., filtered log files 430). Thus, in one embodiment, filter component 414 removes the non-significant spaces (e.g., spaces that do not separate identifiers and/or keywords). In addition, filter component 414 may also remove other decorations that do not pertain to an API change.

The managing component 402 is also responsible for invoking the database updater component 416. The database updater component 416 is configured to input the filtered log files 430, extract information, and update database 426 with the information. The database updater component 416 reads a line from the log file 430, splits the line into separate fields, and writes the fields as a new record in the database 426. The database updater component 416 includes instructions that do not allow duplicate records to be written into the database 426.

Once all the source input files have been processed by the static checker and the relevant programming constructs stored in database 426, the static checker is ready to detect incompatibilities between two databases as described above in conjunction with FIG. 3. In addition, by generating database 426 in accordance with the present invention, documentation related to the new software release may be automatically updated using the information within database 426. Using the teaching of the present invention, the information within database 426 may be utilized for these and various other uses.

In another embodiment of the invention, the static checker 202 is configured to compare two sets of log files, where each set of log files is associated with a different version or release of the software. For this embodiment, parser component 412 may perform the document compare functionality or another component may perform the document compare functionality. The document compare functionality may strip unnecessary information from the log files before performing the document compare, such as stripping line numbers which may have changed, but would not indicate a change in the code. This embodiment allows developers the ability to easily see inadvertent modifications during development.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable medium having instructions for statically checking source code, the instructions comprising:
   identifying programming constructs within a plurality of source code files associated with a software release; and
   storing the programming constructs within a database.

2. The computer-readable medium of claim 1, further comprising:
   comparing the database with another database, the other database containing programming constructs associated with another software release;
   identifying differences between the database and the other database; and
   generating a report of the differences.

3. The computer-readable medium of claim 2, wherein comparing the database with the other database includes comparing the programming constructs within the database and the other database that are associated with a same compilation type.

4. The computer-readable medium of claim 1, further comprising filtering the programming constructs before storing the programming constructs in the database.

5. The computer-readable medium of claim 4, wherein filtering includes removing non-significant spaces in the programming construct.

6. The computer-readable medium of claim 1, further comprising pre-processing the source code files to identify a macro definition and storing the macro definition in the database.

7. The computer-readable medium of claim 1, wherein identifying programming constructs comprises compiling the plurality of source code files.

8. The computer-readable medium of claim 7, wherein compiling the plurality of source code files is performed by a commercially available compiler that supports a compiler plug-in mechanism that communicates with the compiler that supplies the programming constructs.

9. The computer-readable medium of claim 8, wherein compiling occurs within a build environment associated with the compiler.

10. A method for comparing two software releases, the method comprising:
    comparing a first database with a second database, the first database including records describing programming constructs associated with a first software release, the second database including records describing programming constructs associated with a second software release;
    identifying differences between the programming constructs in the first and second database; and
    generating a report listing the differences.

11. The method of claim 10, wherein comparing the first database with the second database includes comparing the programming constructs within the first database and the second database that are associated with a same compilation type.

12. The method of claim 10, wherein comparing includes querying the first and second database using a standard query language.

13. A computer system for statically checking source code, the computer system comprising:
    a processor; and
    a memory, the memory being allocated for a plurality of computer-executable instructions which are loaded into the memory for execution by the processor, the computer-executable instructions performing a method comprising:
    identifying programming constructs within a plurality of source code files associated with a software release; and
    storing the programming constructs within a database.

14. The computer system of claim 13, wherein the computer-executable instructions performing the method further comprises:
    comparing the database with another database, the other database containing programming constructs associated with another software release;
    identifying differences between the database and the other database; and
    generating a report of the differences.

15. The computer system of claim 13, wherein the computer-executable instructions performing the method further comprises filtering the programming constructs before storing the programming constructs in the database.

16. The computer system of claim 15, wherein filtering includes removing non-significant spaces in the programming construct.

17. The computer system of claim 13, wherein the computer-executable instructions performing the method further comprises pre-processing the source code files to identify a macro definition and storing the macro definition in the database.

18. The computer system of claim 13, wherein identifying programming constructs comprises compiling the plurality of source code files.

19. A computer-implemented method comprising:
    a means for identifying programming constructs within a plurality of source code files associated with a software release; and
    a means for storing the programming constructs within a database.

20. The computer-implemented method of claim 19, further comprising:
    a means for comparing the database with another database, the other database containing programming constructs associated with another software release;
    a means for identifying differences between the database and the other database; and
    a means for generating a report that lists the differences.

21. The computer-implemented method of claim 19, wherein the means for identifying programming constructs comprises a commercially available compiler that compiles the plurality of source code files.

22. The computer-implemented method of claim 21, further comprising a means for supplying the programming constructs identified by the commercially available compiler to the means for storing the programming constructs.

23. The computer-implemented method of claim 22, wherein the means for supplying the programming constructs includes a compiler plug-in mechanism for communicating information associated with the programming constructs from the compiler to the means for storing the programming constructs.

24. A computer-readable medium encoded with a computer-readable data structure, the data structure comprising:

a plurality of tables, each table being associated with a type of programming construct identified from within a plurality of source code files associated with a software release, each table comprises a plurality of fields associated with the type of programming construct stored in the table.

25. The computer-readable medium of claim 24, wherein one field out of the plurality of fields for each tables stores a compilation type that identifies a condition that was defined for a conditional compilation statement within one of the source code files when the programming construct was identified.

26. The computer-readable medium of claim 24, wherein the type of programming constructs comprises at least one of a function prototype, a structure, a union, a class, an enum, a typedef, and a global variable.

* * * * *